United States Patent
Oh et al.

(10) Patent No.: US 9,543,616 B2
(45) Date of Patent: Jan. 10, 2017

(54) ELECTROLYTE FOR MAGNESIUM RECHARGEABLE BATTERY AND PREPARATION METHOD THEREOF

(71) Applicant: KOREA INSTITUTE OF SCIENCE AND TECHNOLOGY, Seoul (KR)

(72) Inventors: Si Hyoung Oh, Seoul (KR); Byung Won Cho, Seoul (KR); Kyung Yoon Chung, Seoul (KR); Joong Kee Lee, Seoul (KR); Won Young Chang, Seoul (KR); Jae Hyun Cho, Seoul (KR); Junghoon Ha, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/633,807

(22) Filed: Feb. 27, 2015

(65) Prior Publication Data
US 2016/0028117 A1    Jan. 28, 2016

(30) Foreign Application Priority Data
Jul. 25, 2014  (KR) .......................... 10-2014-0094856

(51) Int. Cl.
*H01M 10/54* (2006.01)
*H01M 10/0567* (2010.01)
*H01M 10/054* (2010.01)
*H01M 10/0568* (2010.01)
*H01M 10/0569* (2010.01)

(52) U.S. Cl.
CPC ....... *H01M 10/0567* (2013.01); *H01M 10/054* (2013.01); *H01M 10/0568* (2013.01); *H01M 10/0569* (2013.01); *H01M 2300/0025* (2013.01)

(58) Field of Classification Search
CPC ................ H01M 2300/0025; H01M 10/0568; H01M 10/054
See application file for complete search history.

(56) References Cited

U.S. PATENT DOCUMENTS

| | | | | |
|---|---|---|---|---|
| 5,069,894 A | * | 12/1991 | Bogdanovic | ............ B22F 9/023 423/647 |
| 6,713,213 B2 | | 3/2004 | Ito et al. | |
| 2011/0159381 A1 | * | 6/2011 | Doe | ........................ H01M 4/13 429/337 |
| 2015/0056499 A1 | * | 2/2015 | Dai | ................... H01M 10/0568 429/200 |

FOREIGN PATENT DOCUMENTS

| | | |
|---|---|---|
| JP | 5-076321 B2 | 9/2012 |
| KR | 2020140008104 A | 1/2014 |
| KR | 10-1401062 B1 | 5/2014 |

* cited by examiner

*Primary Examiner* — Emily Le
*Assistant Examiner* — Monique Wills
(74) *Attorney, Agent, or Firm* — Ladas & Parry LLP

(57) ABSTRACT

Disclosed is an electrolyte solution for a magnesium rechargeable battery with a high ionic conductivity and a wide electrochemical window compared to the conventional electrolyte solution. The electrolyte solution is prepared by dissolving magnesium metal into the ethereal solution using combinations of metal chloride catalysts. The electrolyte solution can be applied to fabricate magnesium rechargeable batteries and magnesium hybrid batteries with a markedly increased reversible capacity, rate capability, and cycle life compared to those batteries employing the conventional electrolyte solution. Also disclosed is a method for preparing the electrolyte.

20 Claims, 1 Drawing Sheet

ELECTROLYTE FOR MAGNESIUM RECHARGEABLE BATTERY AND PREPARATION METHOD THEREOF

CROSS-REFERENCE TO RELATED APPLICATIONS

This application claims priority under 35 U.S.C. §119 to Korean Patent Application No. 10-2014-0094856 filed on Jul. 25, 2014 in the Korean Intellectual Property Office, the disclosure of which is incorporated herein by reference in its entirety.

BACKGROUND OF THE INVENTION

1. Field of the Invention

The present invention relates to an electrolyte solution for a magnesium rechargeable battery that is electrochemically stable in a high-voltage region and has an improved ionic conductivity, and a method for preparing the electrolyte.

2. Description of the Related Art

It is well known that the conventional lithium batteries employing lithium metal suffer from the many parasitic reactions of electrolyte systems towards reactive lithium anode, which poses several critical concerns in terms of their safety. Furthermore, lithium is known as an expensive element since it is relatively rarely found as a natural resources. Particularly, with the recent increasing demand for medium- and large-scale applications such as electric vehicles and ESS, safety and cost concerns of rechargeable lithium batteries become one of the dominating factors that should be taken into consideration and are considered to be major obstacles for the medium-/large-scale application.

In attempts to solve such problems, magnesium rechargeable batteries using magnesium metal as an electrode active material have recently been proposed as alternatives to rechargeable lithium batteries. Magnesium rechargeable batteries work by the migration of electrons during intercalation/de-intercalation of magnesium ions from a magnesium plate as an electrode, specifically an anode, into/from a cathode active material. Magnesium has a theoretical capacity similar to that of lithium and is environmentally friendly. Magnesium is far less expensive than lithium and is superior in terms of battery safety to lithium. Due to these advantages, magnesium rechargeable batteries have received considerable attention as a potential replacement for the rechargeable lithium batteries.

Previous research on the development of electrolyte system for the magnesium rechargeable batteries has focused on Grignard solutions (alkyl magnesium halide, RMgX, R=alkyl, X=halide) that shows a reversible Mg deposition and dissolution behavior on the electrode. However, Grignard solutions have low ionic conductivities which causes low charge/discharge rates of batteries, limiting the battery performance. Thus, fundamental improvements are needed to develop more competitive magnesium rechargeable batteries and magnesium hybrid batteries than existing ones.

Magnesium metal is a promising anode material for batteries due to its high energy densities per unit mass and volume (2205 Ah/kg, 3833 Ah/L, respectively). Particularly, magnesium is an abundant natural resource and is easy to handle. In addition, the use of magnesium as an anode material prevents the formation of dendrites on the electrode surface during charge and discharge. For these reasons, magnesium batteries are superior in safety and price competitiveness. In this aspect, magnesium batteries have received a great deal of attention as medium- and large-size battery systems for electrical energy storage and electric vehicles whose market is expected to expand in the near future.

The first serious study on the magnesium rechargeable batteries was first carried out by T. Gregory et. al. in 1990s although they belong to one of the battery systems with highest theoretical energy densities, only second to lithium batteries. However, for more than a decade after this report, there have been few reports on magnesium batteries. In the 2000's, D. Aurbach's group at Bar-Ilan University developed Chevrel-phase cathode active materials to ensure reversibility. Since then, magnesium batteries have again begun to attract much attention as promising alternatives to rechargeable lithium batteries for their ability to solve the safety and price problems of lithium batteries. However, the energy density of magnesium rechargeable batteries developed hitherto is half or less than that of lithium-ion batteries. Under these circumstances, there is an urgent need to develop new cathode active materials, electrolyte materials, and current collectors.

Particularly, there are many challenges related to the reversible deposition and dissolution of magnesium metal on the negative electrodes, the reversible insertion and de-insertion of $Mg^{2+}$ ions into the cathode materials, and the diffusion of $Mg^{2+}$ ions within the solid phase. A key solution to these challenges is to develop new electrolytes applicable to both cathode and anode.

Cathode active materials and electrolytes are two main research fields in the development of magnesium batteries. In the field of cathode active materials, various compounds, such as metal-sulfur compounds, organosulfur compounds, metal oxides, and metal silicate compounds, are being investigated to achieve high reversible capacity per unit weight and enhanced reversibility. However, the performance of these compounds is not yet satisfactory. In the current state of the art, the only cathode active materials such as Chevrel-phase $Mo_6S_8$ and $Mo_6Se_8$ show battery performance suitable for commercialization.

In the field of electrolytes, most studies have focused on Grignard solutions that are reversible with magnesium anodes. In recent years, some magnesium materials, including magnesium aluminate, have been reported to exhibit excellent performance characteristics. However, Grignard electrolytes capable of reversibly depositing and dissolving magnesium are very reactive with common cathode materials due to their high reducing power, making it impossible to practically apply to batteries. In contrast, the conventional electrolytes based on magnesium salt dissolved in organic solvent capable of reversibly intercalating/deintercalating $Mg^{2+}$ ions into/from cathode materials form thick passivation films on the surface of magnesium anodes, impeding reversible deposition and dissolution of the metal.

U.S. Pat. No. 6,713,213 to Matsushita Electric Industrial Co., Ltd. suggests a non-aqueous magnesium rechargeable battery comprising a rechargeable positive electrode, a non-aqueous electrolyte, and a rechargeable negative electrode, wherein the non-aqueous electrolyte contains a halogen-containing organic magnesium compound represented by RMgX.

Japanese Patent Publication No. 2007-188709 to Sony suggests an electrochemical device having a first electrode, a second electrode, and an electrolyte wherein an active material of the second electrode forms magnesium ions as a result of oxidation and the electrolyte is a mixture of a Grignard solution represented by RMgX (where R is an alkyl or aryl group and X is a fluorine, chlorine or bromine) and an organometallic compound or a salt other than magnesium salts.

However, these electrolytes have poor electrochemical stability at high potential region and low ionic conductivities, and the battery and the device have low charge/discharge rates at high voltages, limiting their performance. Thus, further improvements are needed to develop competitive high voltage magnesium batteries and magnesium hybrid batteries in comparison with existing batteries.

SUMMARY OF THE INVENTION

An object of the present invention is to provide a novel electrolyte for a magnesium rechargeable battery that is highly electrochemically stable in the high-potential region and at the same time has high ionic conductivity.

A further object of the present invention is to provide a method of preparing the electrolyte for the magnesium rechargeable battery that is highly electrochemically stable in the high-potential region.

Another object of the present invention is to provide a magnesium rechargeable battery and a rechargeable magnesium hybrid battery including the electrolyte with superior electrochemical stability in the high-potential region and high ionic conductivity.

One aspect of the present invention is directed to an electrolyte for a magnesium battery including a metal chloride salt, magnesium ions, and an organic solvent.

A further aspect of the present invention is directed to an electrolyte for a magnesium battery including a metal chloride salt, magnesium ions, an organic solvent, and a compound represented by Formula 1:

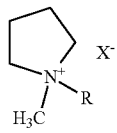

(1)

Another aspect of the present invention is directed to a method of preparing an electrolyte for a magnesium rechargeable battery, including (a) adding a magnesium powder to a solution of a metal chloride salt in an organic solvent to obtain a first solution.

Yet another aspect of the present invention is directed to a magnesium rechargeable battery including the electrolyte according to any one of the exemplary embodiments.

The electrolyte solution for a magnesium rechargeable battery with a large electrochemical window according to the present invention is highly electrochemically stable in the high-potential region and has high ionic conductivity compared to conventional electrolytes including magnesium salts based on Grignard solutions. In addition, the electrolyte of the present invention causes no side reactions at both cathode and anode, allowing the charge/discharge efficiency of a battery to reach a level of 100%. Furthermore, the electrolyte of the present invention can be used to fabricate a high-performance magnesium rechargeable battery with higher discharge capacity, longer cycle life, and better high-rate capability than batteries employing the conventional electrolytes. Therefore, the electrolyte of the present invention is suitable for use in high-voltage magnesium rechargeable batteries and magnesium hybrid batteries.

The electrolyte of the present invention has a higher ionic conductivity and exhibits better electrochemical stability than conventional electrolytes. The degree of dissociation of a $Mg^{2+}$ salt in the electrolyte of the present invention is higher than that in conventional electrolytes. The electrolyte of the present invention can be used to fabricate magnesium rechargeable batteries and magnesium hybrid batteries with markedly high reversible capacity, rate capability, and cycle life performance. Particularly, a battery including the electrolyte of the present invention has a greatly improved discharge capacity per unit weight after 100 charge/discharge cycles compared to batteries including conventional electrolytes.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
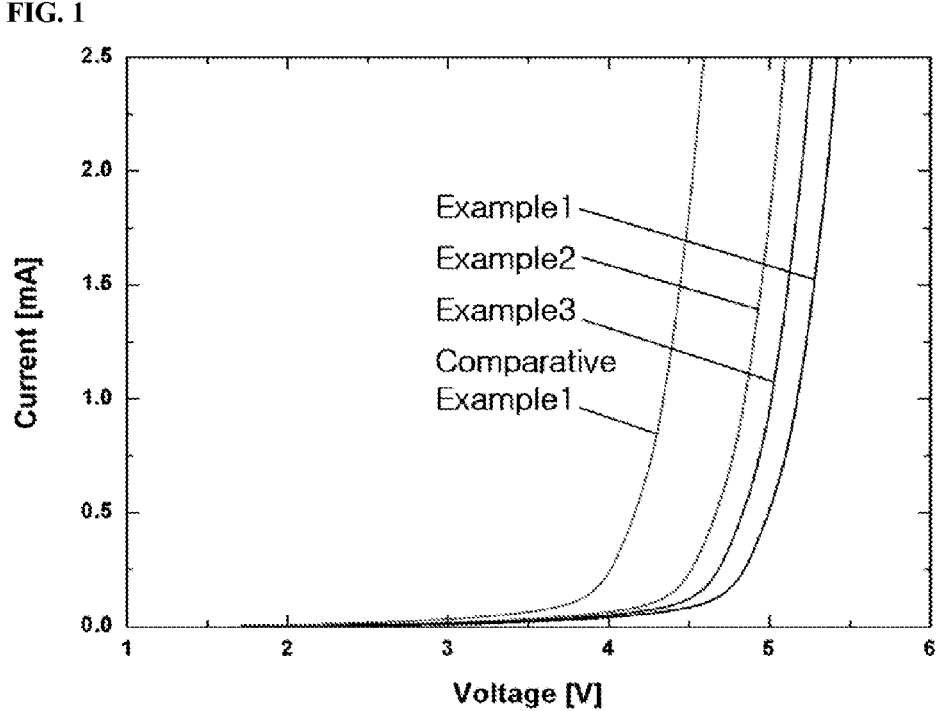
FIG. 1 shows the test results for the electrochemical stability of electrolytes prepared in Examples 1-3 and Comparative Example 1.

Several aspects and various embodiments of the present invention will now be described in more detail.

According to one aspect of the present invention, an electrolyte for a magnesium battery is disclosed which includes a metal chloride salt, magnesium ions, and an organic solvent. The metal chloride salt converts magnesium metal to magnesium ions in the electrolyte.

According to one embodiment, the electrolyte is obtained by removing a solid fraction from a solution in which the metal chloride salt, the magnesium metal, and the magnesium ions are in equilibrium, and collecting the remaining liquid fraction. The metal chloride salt chemically reacts with a magnesium metal powder in the organic solvent. At this time, the metal chloride salt catalytically acts on the surface of the magnesium metal, and as a result, the magnesium metal is ionized and dissolved in the organic solvent. This process is continued until the dissolution reaction of the magnesium metal reaches chemical equilibrium in which the concentration of the magnesium ions in the solvent does not increase any further. The electrolyte of the present invention is obtained by removing the solid fraction from the solution and collecting the remaining liquid fraction.

According to a further embodiment, the metal chloride salt is selected from $AlCl_{3-n}R_n$ (where n is an integer from 0 to 3 and R is selected from alkyl, aryl, heteroaryl, and alkenyl groups), $BCl_{3-n}R_n$ (where n and R are as defined above), $CrCl_3$, $FeCl_3$, $MnCl_2$, $FeCl_2$, $CoCl_2$, $NiCl_2$, $CuCl_2$, $ZnCl_2$, $TiCl_4$, $ZrCl_4$, $VCl_4$, $NbCl_5$, $RhCl_3$, and mixtures thereof.

The alkyl group may be a $C_1$-$C_7$ or $C_8$-$C_{15}$ alkyl group. The aryl group may be, for example, a phenyl or naphthyl group but is not limited thereto. The heteroaryl group may be, for example, a thienyl or indolyl group but is not limited thereto.

According to another embodiment, the organic solvent is selected from tetrahydrofuran (THF), glyme, diglyme, triglyme, tetraglyme, dioxane, anisole, crown ethers, polyethylene glycol, acetonitrile, propylene carbonate, and mixtures thereof.

These solvents are less reactive with magnesium metal and are thus stable. Other solvents are undesirable because they may be spontaneously decomposed on the surface of magnesium metal. Of these solvents, more preferred is THF in which the dissolution of magnesium metal can be promoted by the action of the metal chloride salt.

According to another embodiment, the metal chloride salt is included at a concentration of 0.1 to 1 M. If the concentration of the metal chloride salt is less than the lower limit defined above, magnesium is slowly dissolved during preparation of the electrolyte and the magnesium ions are present at a low concentration in the electrolyte, disadvantageously resulting in low ionic conductivity. Meanwhile, if the concentration of the metal chloride salt exceeds the upper limit defined above, the metal chloride salt may not be completely dissolved and may be undesirably deposited in the form of a solid.

According to another embodiment, the metal chloride salt is a mixture of (i) a first metal chloride salt selected from $AlCl_{3-n}R_n$, $BCl_{3-n}R_n$, and mixtures thereof and (ii) a second metal chloride salt selected from $CrCl_3$, $FeCl_3$, $MnCl_2$, $FeCl_2$, $CoCl_2$, $NiCl_2$, $CuCl_2$, $ZnCl_2$, $TiCl_4$, $ZrCl_4$, $VCl_4$, $NbCl_5$, $RhCl_3$, and mixtures thereof. When the metal chloride salt is a mixture of the first and second metal chloride salts, the use of THF as the organic solvent is preferred because the dissolution of magnesium metal in the solvent (THF) can be promoted by the second metal chloride salt and the reaction of the first metal chloride salt with the dissolved magnesium metal can accelerate the preparation of the electrolyte.

According to another embodiment, each of the first and second metal chloride salts is included at a concentration of 0.01 to 1 M. If the concentrations of the first and second metal chloride salts are lower than the respective lower limits, magnesium is slowly dissolved during preparation of the electrolyte and the magnesium ions are present at a low concentration in the electrolyte, disadvantageously resulting in low ionic conductivity. Meanwhile, if the concentrations of the first and second metal chloride salts exceed the respective upper limits, the metal chloride salts may not be completely dissolved.

According to another embodiment, 1-oxa-2-magnesiacyclohexane is present in the electrolyte.

According to another embodiment, the electrolyte further includes a compound of Formula 1:

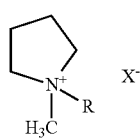

(1)

wherein R is selected from unsubstituted $C_1$-$C_{10}$ linear or branched alkyl groups, $C_1$-$C_{10}$ linear or branched alkyl groups substituted with a $C_1$-$C_{10}$ linear or branched alkoxy group, unsubstituted $C_5$-$C_{12}$ cycloalkyl groups, $C_5$-$C_{12}$ cycloalkyl groups substituted with a $C_1$-$C_{10}$ linear or branched alkoxy group, unsubstituted $C_5$-$C_{12}$ aryl groups, $C_5$-$C_{12}$ aryl groups substituted with a $C_1$-$C_{10}$ linear or branched alkoxy group, unsubstituted allyl groups, and allyl groups substituted with a $C_1$-$C_{10}$ linear or branched alkoxy group, and X is selected from halogen groups, unsubstituted sulfonimide groups, sulfonimide groups substituted with a halogenated alkyl group, unsubstituted sulfonamide groups, and sulfonamide groups substituted with a halogenated alkyl group.

The compound of Formula 1 is an ionic liquid capable of forming a complex with $Mg^{2+}$ ions. This complexation can improve the ionic conductivity of the electrolyte, the transference number of the $Mg^{2+}$ ions, and the degree of dissociation of the magnesium salt.

According to another embodiment, R in Formula 1 is selected from allyl, methyl, ethyl, propyl, isopropyl, butyl, isobutyl, 2-[2-(2-methoxyethoxy)ethoxy]ethyl, cyclopentyl, cyclohexyl, and phenyl groups.

According to another embodiment, the compound of Formula 1 is included in an amount of 0.01 to 1% by weight. If the content of the compound of Formula 1 is less than the lower limit defined above, a complex with magnesium ions may be formed in a small amount and the effect of improving the degree of dissociation may deteriorate, resulting in the possibility that an improvement in ionic conductivity may be insignificant. Meanwhile, if the content of the compound of Formula 1 exceeds the upper limit defined above, the ionic liquid is not dissolved and exists in the form of a solid, resulting in an increased resistance of a battery and an increased danger of short-circuiting, making it difficult to apply to a magnesium battery.

According to another embodiment, the compound of Formula 1 is selected from N-allyl-N-methylpyrrolidinium chloride (AMPCl), N-allyl-N-methylpyrrolidinium bromide, N-allyl-N-methylpyrrolidinium bis(trifluoromethane)sulfonimide, N-butyl-N-methylpyrrolidinium bromide (BMPBr), N-butyl-N-methylpyrrolidinium chloride, 1-{2-[2-(2-methoxyethoxy)ethoxy]ethyl}-1-methyl-pyrrolidinium bromide, and 1-{2-[2-(2-methoxyethoxy)ethoxy]ethyl}-1-methylpyrrolidinium chloride.

According to another embodiment, a complex of the compound of Formula 1 with magnesium ions is present in the electrolyte. The complex may have various structures in which the magnesium ions are solvated by the compound of Formula 1. This complexation can effectively improve the ionic conductivity of the electrolyte and the transference number of the magnesium ions.

According to another embodiment, an electrolyte for a magnesium battery is disclosed which further includes a lithium salt in addition to the components of the electrolyte according to any one of the foregoing embodiments. The presence of the lithium salt can effectively improve the reaction rate at a cathode.

According to another embodiment, the lithium salt is selected from LiCl, lithium bis(trifluoromethanesulfonyl)imide, $LiClO_4$, $LiBF_4$, $LiPF_6$, and mixtures thereof.

According to another embodiment, the lithium salt is included at a concentration of 0.1 to 0.5 M. If the lithium salt concentration is less than the lower limit defined above, the ionic conductivity of the electrolyte does not increase to a significant extent and a limited amount of a cathode material may be loaded on a cathode in the fabrication of a hybrid battery. Meanwhile, if the lithium salt concentration exceeds the lower limit defined above, the addition of the lithium salt in an excessive amount does not contribute to further improvement of ionic conductivity and the electrolyte is supersaturated, leaving a portion of the lithium salt undissolved.

In a further aspect, the present invention provides a method of preparing an electrolyte for a magnesium battery, including (a) adding a magnesium powder to a solution of a metal chloride salt in an organic solvent to obtain a first solution.

According to one embodiment, the method further includes, after step (a), (b) adding the compound of Formula 1 to the first solution to prepare a second solution.

According to a further embodiment, the method further includes (c) adding a lithium salt to the first solution after step (a) or to the second solution after step (b) to prepare a third solution.

In another aspect, the present invention provides a magnesium battery including the electrolyte according to any one of the exemplary embodiments. The magnesium battery of the present invention may be a magnesium rechargeable battery or a magnesium hybrid battery but is not limited thereto.

A further description will be given of other embodiments of the present invention. However, the present invention is not to be construed as being limited to the following description.

According to one embodiment of the present invention, a magnesium powder is added to a solution of a metal chloride salt such as $AlCl_3$ or $CrCl_3$ in an organic solvent, which distinguishes the electrolyte of the present invention from conventional Grignard solutions. The magnesium is slowly dissolved until the metal chloride salt, the magnesium metal, and magnesium ions reach equilibrium. The metal chloride salt is an electrolyte salt for the formation of the magnesium ions, which are very important ions of the electrolyte for a magnesium battery.

According to one embodiment, the ionic liquid compound represented by Formula 1 may be added to the electrolyte to form a complex with the magnesium ions. A lithium salt may be optionally further added to the solution in equilibrium or the solution containing the complex to improve the reaction rate at a cathode.

Particularly, when the organic solvent is tetrahydrofuran (THF) and the metal chloride salt is a mixture of a first metal chloride salt (e.g., aluminum chloride ($AlCl_3$)) and a second metal chloride salt (e.g., $CrCl_3$), 1-oxa-2-magnesiacyclohexane having the structure of Formula 2 is formed from the magnesium metal and THF by catalytic activity of the second metal chloride salt and is mixed with the first metal chloride salt in the electrolyte.

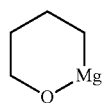

(2)

This compound is then combined with $AlCl_3$ to produce the electrolyte solution containing a lot of ionic species for the charge transport. The electrolyte solution thus prepared essentially includes $[MgCl.5THF]^+$ or $[Mg_2Cl_3.3THF]^+$ as cations and alkylalkoxyaluminates like $[Al(C_4H_8O)_2]^-$, $[AlCl_2(C_4H_8O)]^-$ or polymeric compounds as anions. $[Al(C_4H_8O)_2]^-$ and $[AlCl_2(C_4H_8O)]^-$ are represented by Formulae 3 and 4, respectively:

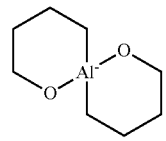

(3)

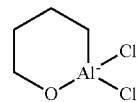

(4)

The total concentration of the metal chloride salts is preferably from about 0.001 to about 1.0 M.

The mechanism of the charge/discharge process of a magnesium battery including the electrolyte will be discussed below. When the battery is discharged, oxidation occurs at the magnesium anode in which the magnesium metal is oxidized to $Mg^{2+}$ ions, which are dissolved in the electrolyte. The $Mg^{2+}$ ions migrate from the electrolyte to the cathode. The $Mg^{2+}$ ions are reduced at the cathode. Specifically, the $Mg^{2+}$ ions are intercalated into the cathode active material structure.

When charged, oxidation occurs at the cathode in which $Mg^{2+}$ ions are deintercalated from the cathode active material structure to the electrolyte. The deintercalated $Mg^{2+}$ ions migrate from the electrolyte to the magnesium anode. $Mg^{2+}$ ions are reduced to magnesium at the anode where Mg plating occurs.

The reaction at the cathode is slow due to the intercalation and deintercalation of $Mg^{2+}$ ions, which limits the choice of cathode active materials suitable to accelerate the reaction. According to some embodiments of the present invention, the lithium salt is further added to replace the intercalation and deintercalation of $Mg^{2+}$ ions at the cathode active material by those of $Li^+$ ions. The lithium salt provides a wide choice of cathode active materials.

The lithium salt may be included in the electrolyte in which the compound of Formula 1 is either present or absent. The use of the lithium salt can improve the reaction rate at the cathode and can effectively widen the choice of cathode active materials.

Conventional Grignard electrolytes suffer from low ionic conductivity and low transference number of $Mg^{2+}$ ions in high power batteries such as batteries for electric vehicles and need to be improved. In accordance with some embodiments of the present invention, the use of the ionic liquid compound represented by Formula 1 can improve the ionic conductivity of the electrolyte and the transference number of $Mg^{2+}$ ions due to its the ability to form a complex with $Mg^{2+}$ ions. Therefore, the electrolyte of the present invention can be used to fabricate a magnesium battery with improved power and its applicability can be extended to high output magnesium batteries for electric vehicles.

According to some embodiments of the present invention, the electrolyte of the present invention includes 0.01 to 1% by weight of the ionic liquid compound of Formula 1.

If the ionic liquid is added in an amount of less than 0.01% by weight, a complex with magnesium ions is formed in a small amount and the effect of improving the degree of dissociation may deteriorate, resulting in low ionic conductivity. Meanwhile, if the ionic liquid is added in an amount exceeding 1% by weight, the ionic liquid is not dissolved and exists in the form of a solid, resulting in an increased resistance of a battery and an increased danger of short-circuiting, making it difficult to apply to a magnesium battery.

The present invention also provides a method of preparing an electrolyte for a magnesium battery, including (a) dissolving metal chloride salts (e.g., $AlCl_3$ and $CrCl_3$) in an organic solvent, adding a magnesium powder to the solution, allowing the magnesium to be slowly dissolved to prepare a first electrolyte solution in which the metal chloride salts, the magnesium metal, and magnesium ions reach equilibrium, and optionally adding the ionic liquid compound represented by Formula 1 to the first electrolyte solution to prepare a second electrolyte solution in which a complex of the ionic liquid compound with the magnesium ions is formed, and (b) dissolving a lithium salt capable of improving the reaction rate at a cathode in the first electrolyte solution or the second electrolyte solution to prepare a third electrolyte solution.

The electrolyte prepared by the method of the present invention was found to have a higher ionic conductivity (Test Example 1) and shows more stable electrochemical properties in the range of 0 to 4 V (vs. $Mg/Mg^{2+}$) (see Test Example 2) than a conventional electrolyte for a magnesium battery. These results demonstrate that the electrolyte of the present invention is suitable for use in a magnesium battery.

The present invention will be explained in more detail with reference to the following examples. However, these examples are not to be construed as limiting or restricting the scope and disclosure of the invention. It is to be understood that based on the teachings of the present invention including the following examples, those skilled in the art can readily practice other embodiments of the present invention whose experimental results are not explicitly presented.

EXAMPLES

Example 1

Preparation of Solution of $AlCl_3$—$CrCl_3$-BMPBr-Magnesium Ion Complex-LiCl Mixture 6.667 g of $AlCl_3$ and 0.1584 g of $CrCl_3$ were dissolved in 100 mL of THF as a solvent to prepare a solution in which the $AlCl_3$ and $CrCl_3$ were present at concentrations of 0.5 M and 0.01 M, respectively. To the solution was added 3 g of a magnesium powder. The mixture was kept for 24 h to allow the $AlCl_3$, $CrCl_3$, magnesium metal, and magnesium ions to reach equilibrium, and then 0.2 g of BMPBr as an ionic liquid was dissolved therein to form a complex with the magnesium ions. Finally, 2.120 g of LiCl was dissolved in 100 mL of the solution containing the magnesium ion complex. The resulting solution was composed of 0.5 M $AlCl_3$, 0.01 M $CrCl_3$, 0.2% BMPBr, the magnesium ion complex, and 0.5 M LiCl. After removal of the solid fraction from the solution, the remaining liquid fraction was collected and used as an electrolyte.

Example 2

Preparation of Solution of $AlCl_3$—$CrCl_3$-AMPCl-Magnesium Ion Complex-LiCl Mixture An electrolyte was prepared in the same manner as in Example 1, except that AMPCl was used as an ionic liquid instead of BMPBr.

Example 3

Preparation of Solution of $AlCl_3$—$CrCl_3$-BMPCl-Magnesium Ion Complex Mixture An electrolyte was prepared in the same manner as in Example 1, except that LiCl was not added to the solution.

Example 4

Preparation of Solution of $AlCl_3$—$CrCl_3$ Mixture

An electrolyte was prepared in the same manner as in Example 1, except that the ionic liquid and LiCl were not used.

Example 5

Preparation of Solution of $AlCl_3$—$CrCl_3$—LiCl Mixture

An electrolyte was prepared in the same manner as in Example 1, except that the ionic liquid was not used.

Comparative Example 1

Preparation of APC Solution

In accordance with a conventional method, 0.04 moles of $(PhMgCl)_2$—$AlCl_3$ as a double salt was dissolved in 100 mL of THF as a solvent to prepare a 0.4 M APC electrolyte.

Test Example 1

Ionic Conductivity Measurement

The electrolytes of Examples 1-5 and Comparative Example 1 were measured for ionic conductivity. The results are shown in Table 1.

TABLE 1

| | Ionic conductivity (mS/cm) |
|---|---|
| Example 1 | 7.0 |
| Example 2 | 6.5 |
| Example 3 | 5.0 |
| Example 4 | 4.5 |
| Example 5 | 5.0 |
| Comparative Example 1 | 4.0 |

As can be seen from the results in Table 1, the electrolytes of Examples 1-3 had ionic conductivities of 5.0-7.0 mS/cm in the normal operating temperature range and the electrolytes of Examples 4 and 5 containing no ionic liquid had ionic conductivities of 4.5 and 5.0 mS/cm, respectively, which were higher than the electrolyte of Comparative Example 1 (4.0 mS/cm).

In addition, the degrees of dissociation of the $Mg^{2+}$ salt were improved in the electrolytes of Examples 1-5

Test Example 2

Electrochemical Stability Evaluation

In this test example, the electrolytes of Examples 1-3 and Comparative Example 1 were evaluated for electrochemical stability. First, a nickel electrode, a PP separator, and a magnesium metal as a counter electrode were assembled to construct a magnesium half cell. Each of the electrolytes of Examples 1-3 and Comparative Example 1 was injected into the half cell. Thereafter, the electrochemical stability of the cell was investigated by linear sweep voltammetry at a scan rate of 10 mV/sec. The results are shown in FIG. 1.

Referring to FIG. 1, the electrolytes of Examples 1-3 were found to show more stable electrochemical properties in the voltage range of 0 to 4 V (vs. $Mg/Mg^{2+}$) than the electrolyte of Comparative Example 1. These results indicate that $[MgCl.5THF]^+$ and $[Mg_2Cl_3.3THF]^+$ cations and the anions of Formulae 3 and 4 formed in the electrolytes of Examples 1-3 underwent less oxidative decomposition on the electrode surface, suggesting that the use of high voltage cathode materials, together with the electrolytes, can lead to a more stable electrochemical behavior.

Test Example 3

Measurement of Magnesium Battery Performance

In this test example, an investigation was made as to whether the use of the electrolytes of Examples 1-3 contributed to an improvement in the performance of magnesium rechargeable batteries and magnesium hybrid batteries. First, a magnesium anode, a PP separator, and a $Mo_6S_8$ cathode were assembled and each of the electrolytes was injected thereinto to fabricate a magnesium rechargeable battery or a magnesium hybrid battery. The capacity, and cycle life of the battery were investigated at a charge/discharge voltage set to 0.5 to 1.9 V. The results are shown in FIG. 2.

Figure 2:
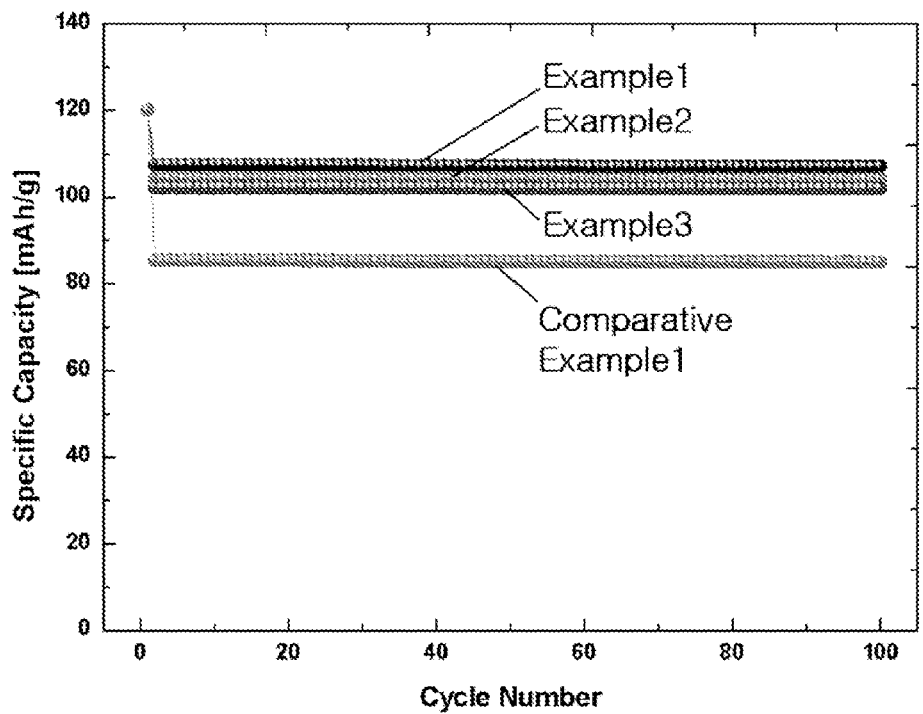
FIG. 2 shows the test results for the reversible capacities, rate performance, and cycle life characteristics of magnesium rechargeable batteries and magnesium hybrid batteries fabricated using electrolytes prepared in Examples 1-3 and Comparative Example 1.

Referring to FIG. 2, after 100 charge/discharge cycles, the batteries including the electrolytes of Examples 1-3 were found to have specific discharge capacities of 102 mAh/g or more per unit mass, which were much higher than the battery including the electrolyte of Comparative Example 1 (85 mAh/g).

In conclusion, the electrolytes of Examples 1-3 had higher ionic conductivities and showed better electrochemical stability than the conventional electrolyte. In addition, the degrees of dissociation of the $Mg^{2+}$ salt in the electrolytes of Examples 1-3 were higher than that in the conventional electrolyte. The batteries including the electrolytes of Examples 1-3 were found to have markedly improved capacities, and cycle life characteristics. Particularly, the batteries including the electrolytes of Examples 1-3 were found to have greatly improved specific discharge capacities per unit mass after 100 charge/discharge cycles compared to the battery including the conventional electrolyte.

The electrolytes of Examples 4 and 5 containing no ionic liquid compound were slightly less effective than the electrolytes of Examples 1-3 but were found to show greatly improved effects compared to the electrolyte of Comparative Example 1.

What is claimed is:

1. An electrolyte solution for a magnesium rechargeable battery made from the combination of
   metal chlorides,
   magnesium metal,
   an organic solvent, and
   an ionic liquid comprising a compound of Formula 1:

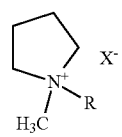

(1)

wherein R is selected from unsubstituted $C_1$-$C_{10}$ linear or branched alkyl groups, $C_1$-$C_{10}$ linear or branched alkyl groups substituted with a $C_1$-$C_{10}$ linear or branched alkoxy group, unsubstituted $C_5$-$C_{12}$ cycloalkyl groups, $C_5$-$C_{12}$ cycloalkyl groups substituted with a $C_1$-$C_{10}$ linear or branched alkoxy group, unsubstituted $C_5$-$C_{12}$ aryl groups, $C_5$-$C_{12}$ aryl groups substituted with a $C_1$-$C_{10}$ linear or branched alkoxy group, unsubstituted allyl groups, and allyl groups substituted with a $C_1$-$C_{10}$ linear or branched alkoxy group, and X is selected from halogen groups, unsubstituted sulfonimide groups, sulfonimide groups substituted with a halogenated alkyl group, unsubstituted sulfonamide groups, and sulfonamide groups substituted with a halogenated alkyl group.

2. The electrolyte solution according to claim 1, wherein the electrolyte solution is obtained by removing a solid fraction from a solution in which metal chlorides, the magnesium metal, and the magnesium ions are in equilibrium, and collecting the remaining liquid fraction.

3. The electrolyte solution according to claim 1, wherein the metal chlorides are selected from $AlCl_{3-n}R'_n$ (where n is an integer from 0 to 3 and R' is selected from alkyl, aryl, heteroaryl, and alkenyl groups), $BCl_{3-n}R'_n$ (where n and R' are as defined above), $CrCl_3$, $FeCl_3$, $MnCl_2$, $FeCl_2$, $CoCl_2$, $NiCl_2$, $CuCl_2$, $ZnCl_2$, $TiCl_4$, $ZrCl_4$, $VCl_4$, $NbCl_5$, $RhCl_3$, and mixtures thereof.

4. The electrolyte solution according to claim 1, wherein the organic solvent is selected from tetrahydrofuran (THF), glyme, diglyme, triglyme, tetraglyme, dioxane, anisole, crown ethers, polyethylene glycol, acetonitrile, propylene carbonate, and mixtures thereof.

5. The electrolyte solution according to claim 1, wherein the metal chloride is present at a concentration of 0.001 to 1.0 M.

6. The electrolyte solution according to claim 1, wherein the metal chloride salt is a mixture of (i) a first metal chloride salt selected from $AlCl_{3-n}R'_n$, $BCl_{3-n}R'_n$, and mixtures thereof and (ii) a second metal chloride salt selected from $CrCl_3$, $FeCl_3$, $MnCl_2$, $FeCl_2$, $CoCl_2$, $NiCl_2$, $CuCl_2$, $ZnCl_2$, $TiCl_4$, $ZrCl_4$, $VCl_4$, $NbCl_5$, $RhCl_3$, and mixtures thereof.

7. The electrolyte solution according to claim 6, wherein each of the first and second metal chloride salts is present at a concentration of 0.01 to 1 M.

8. The electrolyte solution according to claim 1, wherein 1-oxa-2-magnesiacyclohexane is a precursor for the formation of the electrolyte solution.

9. The electrolyte solution according to claim 1, wherein R in Formula 1 is selected from allyl, methyl, ethyl, propyl, isopropyl, butyl, isobutyl, 2-[2-(2-methoxyethoxy)ethoxy] ethyl, cyclopentyl, cyclohexyl, and phenyl groups.

10. The electrolyte solution according to claim 9, wherein the compound of Formula 1 is present in an amount of 0.01 to 1% by weight.

11. The electrolyte according to claim 1, wherein the compound of Formula 1 is selected from N-allyl-N-methylpyrrolidinium chloride, N-allyl-N-methylpyrrolidinium bromide, N-allyl-N-methylpyrrolidinium bis(trifluoromethane)sulfonimide, N-butyl-N-methylpyrrolidinium bromide, N-butyl-N-methylpyrrolidinium chloride, 1-{2-[2-(2-methoxyethoxy)ethoxy]ethyl}-1-methyl-pyrrolidinium bromide, and 1-{2-[2-(2-methoxyethoxy)ethoxy]ethyl}-1-methylpyrrolidinium chloride.

12. The electrolyte solution according to claim 1, wherein a complex of the compound of Formula 1 with magnesium ions is present in the electrolyte.

13. The electrolyte according to claim 1, further comprising a lithium salt.

14. The electrolyte according to claim 13, wherein the lithium salt is selected from LiCl, lithium bis(trifluoromethanesulfonyl)imide, $LiClO_4$, $LiBF_4$, $LiPF_6$, and mixtures thereof.

15. The electrolyte according to claim 13, wherein the lithium salt is present at a concentration of 0.1 to 0.5 M.

16. A magnesium battery comprising the electrolyte according to claim 1, wherein the magnesium battery is a magnesium secondary battery or a magnesium hybrid battery.

17. A magnesium battery comprising the electrolyte according to claim 1, wherein the magnesium battery is a magnesium rechargeable battery or a rechargeable magnesium hybrid battery.

18. The electrolyte solution according to claim 1, wherein a complex of the compound of Formula 1 comprises 1-butyl-1-methylpyrrolidinium bromide (BMPBr).

19. The electrolyte solution according to claim 1, wherein a complex of the compound of Formula 1 comprises N-allyl-N-methylpyrrolidinium chloride (AMPCl).

20. An electrolyte solution for a magnesium rechargeable battery comprising
an organic solvent selected from tetrahydrofuran (THF), glyme, diglyme, triglyme, tetraglyme, dioxane, anisole, crown ethers, polyethylene glycol, acetonitrile, propylene carbonate, and mixtures thereof;
a metal chloride selected from $AlCl_{3-n}R'_n$ (where n is an integer from 0 to 3 and R' is selected from alkyl, aryl, heteroaryl, and alkenyl groups), $BCl_{3-n}R'_n$ (where n and R' are as defined above), $CrCl_3$, $FeCl_3$, $MnCl_2$, $FeCl_2$, $CoCl_2$, $NiCl_2$, $CuCl_2$, $ZnCl_2$, $TiCl_4$, $ZrCl_4$, $VCl_4$, $NbCl_5$, $RhCl_3$, and mixtures thereof;
an ionic liquid comprising a compound of Formula 1:

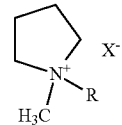

(1)

wherein R is selected from unsubstituted $C_1$-$C_{10}$ linear or branched alkyl groups, $C_1$-$C_{10}$ linear or branched alkyl groups substituted with a $C_1$-$C_{10}$ linear or branched alkoxy group, unsubstituted $C_5$-$C_{12}$ cycloalkyl groups, $C_5$-$C_{12}$ cycloalkyl groups substituted with a $C_1$-$C_{10}$ linear or branched alkoxy group, unsubstituted $C_5$-$C_{12}$ aryl groups, $C_5$-$C_{12}$ aryl groups substituted with a $C_1$-$C_{10}$ linear or branched alkoxy group, unsubstituted allyl groups, and allyl groups substituted with a $C_1$-$C_{10}$ linear or branched alkoxy group, and X is selected from halogen groups, unsubstituted sulfonimide groups, sulfonimide groups substituted with a halogenated alkyl group, unsubstituted sulfonamide groups, and sulfonamide groups substituted with a halogenated alkyl group; and
an alkylalkoxyaluminate comprising at least one of [Al$(C_4H_8O)_2$]$^-$ which corresponds to Formula (3):

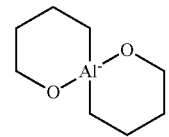

(3)

and [AlCl$_2$(C$_4$H$_8$O)]$^-$ which corresponds to Formula (4)

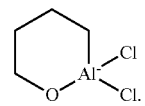

(4)

* * * * *